United States Patent
Parisi

(10) Patent No.: US 8,880,066 B2
(45) Date of Patent: Nov. 4, 2014

(54) SYSTEM FOR SIGNALING THE AVAILABILITY OF A DEVICE TO RECEIVE FORWARD DATA

(75) Inventor: Mark Dominic Parisi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1840 days.

(21) Appl. No.: 11/744,168

(22) Filed: May 3, 2007

(65) Prior Publication Data

US 2008/0274740 A1     Nov. 6, 2008

(51) Int. Cl.
     *H04W 4/00*      (2009.01)
     *H04W 8/06*      (2009.01)
     *H04W 8/12*      (2009.01)

(52) U.S. Cl.
     CPC .. *H04W 8/06* (2013.01); *H04W 8/12* (2013.01)
     USPC ................. 455/435.1; 455/435.2; 455/435.3; 455/436

(58) Field of Classification Search
     USPC ............................ 455/435.1–435.3, 436–439
     See application file for complete search history.

(56) References Cited

U.S. PATENT DOCUMENTS 6,463,055 B1 * 10/2002 Lupien et al. ................. 370/353
2007/0086399 A1    4/2007 Akiyama

FOREIGN PATENT DOCUMENTS

EP      1478205      11/2004

OTHER PUBLICATIONS

International Search Report, PCT/US08/062573, International Search Authority, European Patent Office, Aug. 28, 2008.
Written Opinion, PCT/US08/062573, International Search Authority, European Patent Office, Aug. 28, 2008.

* cited by examiner

*Primary Examiner* — Wayne Cai
(74) *Attorney, Agent, or Firm* — Gerald P. Joyce, III

(57) ABSTRACT

System for signaling the availability of a device to receive forward data. A method is provided that includes receiving an information message to be transmitted to the device, and transmitting a registration cancellation message to cancel registration of the device at a visiting location register. The method also includes receiving a registration message to register the device on a communication network, and transmitting the information message to the device.

21 Claims, 2 Drawing Sheets

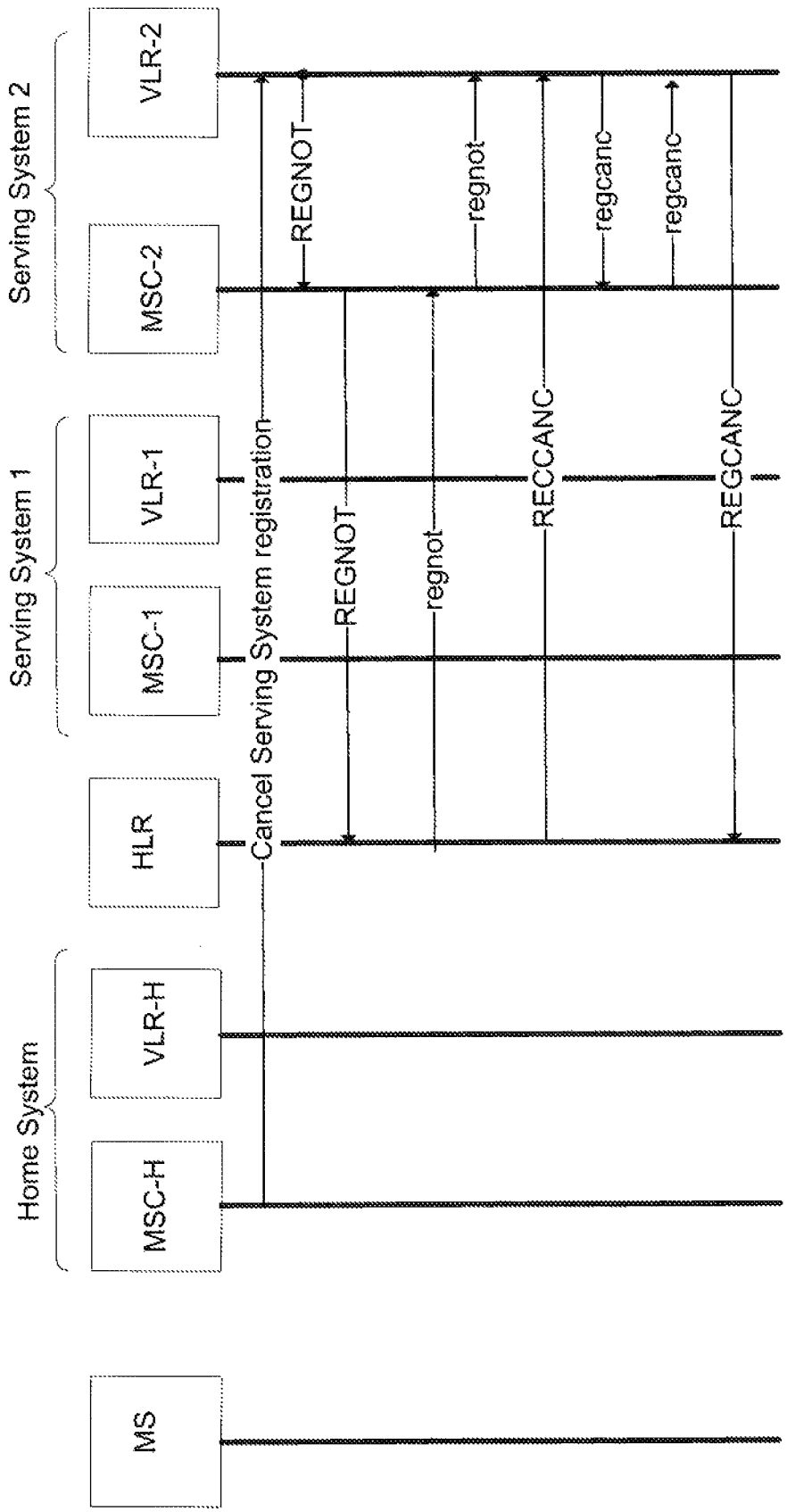

SYSTEM FOR SIGNALING THE AVAILABILITY OF A DEVICE TO RECEIVE FORWARD DATA

BACKGROUND

1. Field

The present Application relates generally to the operation of communication systems, and more particularly, to a system for signaling the availability of a device to receive forward data in a communication network.

2. Background

Advances in technology have provided for increased automation in many industries. For example, in the shipping industry, technology has allowed for the shipment and delivery of cargo virtually around the clock. Delivery vehicles now carry and deliver cargo to all parts of the country. For example, in the trucking industry, cargo-carrying tractor-trailers may be driven hundreds or thousands of miles to reach a delivery site. In some cases, a delivery vehicle may make several intermediate stops before reaching its final destination. Thus, with the expansion of delivery schedules and routes, it has become increasingly important for vehicle communication systems to maintain and/or establish communications. With remote central stations to provide status reports or other information.

Typically, delivery vehicles include self contained communication devices that provide for transmission of information to a central station. For example, a vehicle may report its current position, cargo state, engine parameters or other information to a central station. To provide these communications, major service providers with complete communication networks, such as commonly available nationwide telecommunication networks, are used to obtain communications between vehicles and a central station. However, in some regions of the country, for example, at the border regions, coverage provided by these serving systems may be limited. Thus, some delivery systems utilize specialized serving communication networks to supplement of the coverage of serving system with a national communication network. These specialized networks utilize special hardware and/or additional systems to provide coverage over a large region. For example, as a vehicle approaches the border with another country, such a specialized network may be used to provide communications between the vehicle and a central station because the primary network may have limited coverage in that region.

During operation of a delivery vehicle, it is desirable to establish communication with the vehicle using either a national serving system or a specialized serving system network. However, a vehicle's communicating device may go into a sleep mode to conserve power. Usually, the sleep mode is scheduled to occur at periodic intervals. During sleep mode, communications with the vehicle cannot occur. When the device wakes up, it may attempt to communicate over the primary network to receive information from the central station. However, if the device for some reason cannot communicate over the primary network, it may attempt to communicate over the specialized communications network.

Unfortunately, the central station may not know whether the vehicle and its communication device are in coverage on the national serving system, the specialized serving system, or outside all coverage areas. Conventional systems may not determine when a device is listening for communications on their network. Thus, the central station may not know if the communication device is attempting to listen to messages on the specialized serving system network.

Therefore, what is needed is a method and a system that is able to initiate communications with the mobile station over either communication network. This embodiment of this invention improves coverage area so the mobile station can determine which serving system to listen for incoming traffic on.

ACRONYMS

The written description uses a large number of acronyms to refer to various services and system components. Although known, use of several of these acronyms is not strictly standardized in the art. For purposes of this discussion, acronyms therefore will be defined as follows:
American National Standards Institute (ANSI-41)
Base Station Controller (ESC)
Electronic Serial Number (ESN)
Home Location Register (H-LR)
Mobile Directory Number (MDN)
Mobile Identification Number (MIN)
Mobile Station (MS)
Mobile Switching Center (MSC)
Number Addressing Module (NAM)
Plain Old Telephone Service (POTS)
Public Data Switching Network (PDSN)
Public Switched Telephone Network (PSTN)
Registration Cancellation (REGCANC)
Registration Notification (REGNOT)
Service Management System (SMS)
Telecommunications Company (TELCO)
Visitor Location Register (VLR)

SUMMARY

In one or more embodiments of this invention, a mobile stations capable of supporting two network personalities is provisioned on one serving system with one of it's available personalities. In addition this mobile station may be provisioned on another serving system with it's other personality. For example, the system is suitable for use with vehicle mounted communication devices that comprise personality logic to communicate over one or more communication networks using one or more network personalities. The preferred embodiment of this invention is one in which the MS is provisioned on a serving system that has no wireless coverage of its own. As a result, coverage is provided by other serving systems with wireless coverage over most of the region of interest in the communication network. In this embodiment services for the MS is established via roaming agreements. In one embodiment of this invention, the home system has no coverage of it's own, serving systems 1 and 2 have wireless coverage for large areas. The roaming partners for the purpose of this document are referred to as serving system 1 and 2

In one embodiment, the MS registers on the HLR of the home system to let the serving system know the MS is authorized to make and receive calls; however, as the mobile roams the network it's registration is cached on the VLR of the serving systems in the networks where it roams. If the MS does not wake up while roaming to other serving systems it's registration is still cached on the last serving system on which it might have registered. A message is transmitted to the device, which may instruct the device to contact a central station for more information or instructions. Thus, the system operates to provide a signaling mechanism to determine when a device is available to receive forward data.

In this embodiment, a method is provided for signaling that a device is available to receive forward communications. The method comprises a mechanism whereby the home system where the MS is registered with one NAM1 sends a message to cancel the registration of the MS on serving system 2 where the MS is registered with NAM 2. This will initiate the removal of the cached authorization information for the MS from the VLR on serving system 2. As a result, the MS listens on it's home system for incoming calls.

In one embodiment, communications in the network is accomplished via ANSI-41 connections between the networks in the communication network. The ANSI-41 protocol provides the means by which forward registration cancellation is executed and registration notification is provided for third party mobiles that roam onto roaming partner or primary networks that provide wireless coverage in the region of interest. The use of ANSI-41 messaging does not preclude the use of packet based or any other compliant standard protocol.

Other aspects of the embodiments will become apparent after review of the hereinafter set forth Brief Description of the Drawings, Detailed Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein;

FIG. 2 illustrates a diagram of one embodiment of a signaling system.

DETAILED DESCRIPTION

Figure 1:
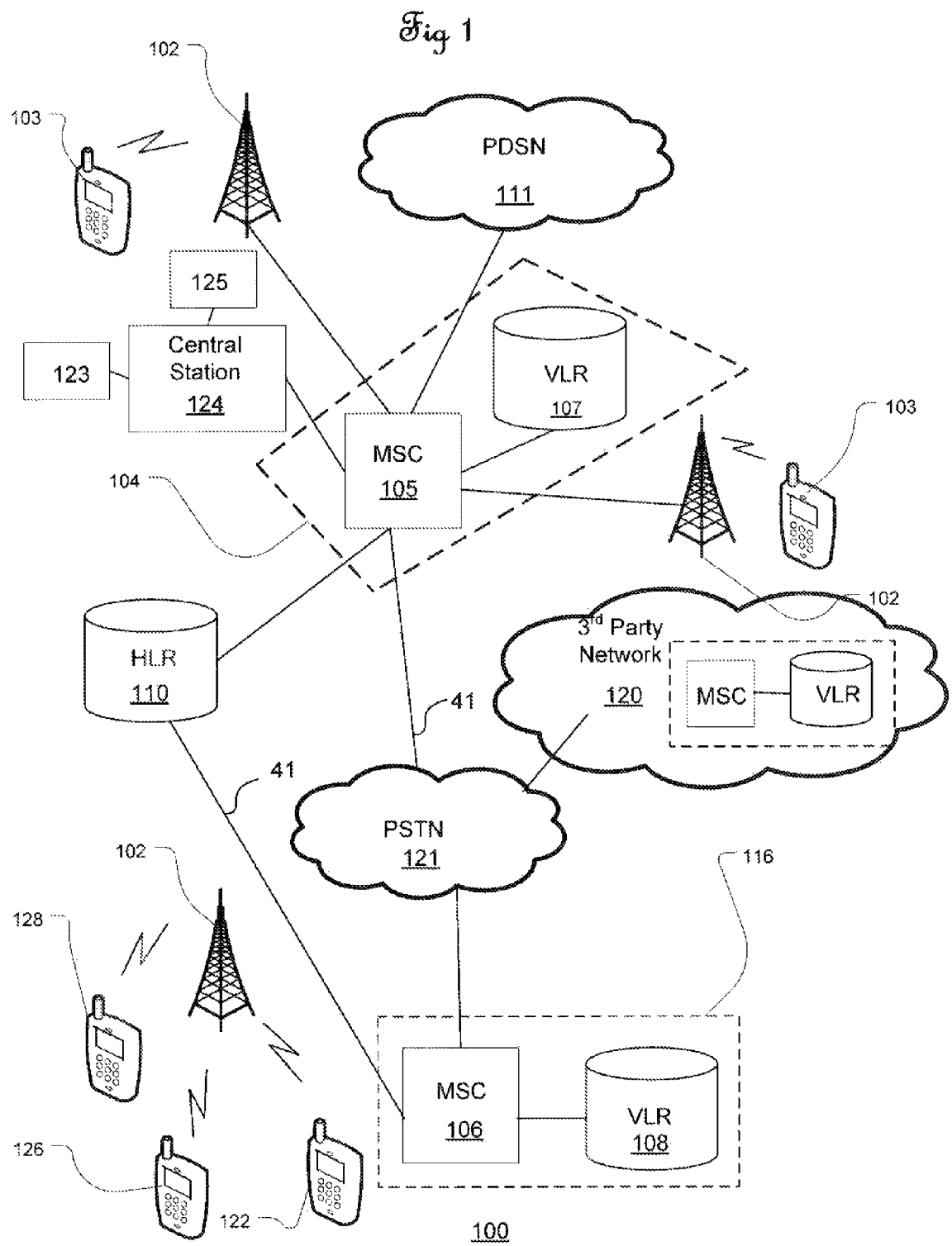
FIG. 1 illustrates the overall architecture of the a wireless communication network that in which the signaling system for forwarding the registration of an MS from the home system is implemented.

In one embodiment, an integrated telecommunications network is provided to support ANSI-41 interfaces between networks operated by, for instance, different TELCOs. In this environment, an MS from a third party network can roam into the network of one or more primary carriers. In addition, the third party network supports standard ANSI-41 protocols, data and voice over the PTSN and PDSN. For example, the system is suitable for use in a wireless network to signal the availability of a device to receive forward communications after it completes a power-down sleep cycle or otherwise becomes available. All routes, whether over the PDSN or PTSN networks, are supported for forward registration of the third party MSs.

FIG. 1 illustrates a communication network 100 that comprises one embodiment of a signaling system. Communication network 100 comprises a home system 104 which represents the home system for an MS through which wireless communications emanate. Home system 104 includes MSC 105 and VLR 107. An MS communicates over-the-air via the BSC 102 connected to home MSC 105 of home system 104. Home system 104 is connected to PDSN 111 and PTSN 121 by ANSI-41 trunks 41. HLR 110 is also connected to home system 104 and serving system 116 via ANSI-41 trunks 41. Serving system 116 includes MSC 106 and VLR 108. Wireless communication is accomplished via the BSC 112. Additionally, third party network 120 is connected to the home system 104 and serving system 116 via ANSI-41 trunks 41. MS 126 of third party network 120 can roam from network 100 onto the home system 104 or serving system 116. MS 126 may be associated with, for instance, delivery vehicles, tractor-trailer vehicles, etc. Home and serving systems 104 and 116, respectively, and a the third party network 120 support and provide POTS, voice, data, and/or other services to MSs over the entire communication network 100.

It is assumed herein that each roaming third party MS 126 is capable of supporting multiple NAMs. The NAM is a characteristic of the MS which may include the MIN and ESN of a respective MS. In one embodiment, the third party MS supports two NAMs—one populates a NAM with a MIN and the other populates a NAM with a MDN. The MIN provides a key for looking up the mobile profile in an HLR or VLR. In addition, services supported on home and serving systems 104 and 116 for particular MSs are determined by the MIN. Third party MSs are also capable of supporting data and voice communications over the entire communication network 100 using either NAM.

In connection with third party MS 126 roaming onto home or serving or system 104 or 116, respectively, MS 126 pages or sends a message to a MSC to request service or listens for pages or messages from the serving or home system 104 or 116, respectively. In one aspect, third party network 120 uses home location register (HLR) 110 that includes information about terminals that are registered (i.e., authenticated and/or authorized) to communicate over the network 100. During operation of the signaling system, the serving MSC 116 authorizes MSs identified in the HLR 110 to operate on the entire communications network 100.

As a way of operating more efficiently, the serving MSC 106 sends MS profile information from HLR 110 to serving VLR 108 for caching. For example, by providing information for serving VLR 108 at the serving system 116, it is possible for terminals to register with network 100 by communicating with only serving system 116, thereby reducing communications with the home system 104. Thus, when a terminal awakens from a power-down mode and wishes to register with serving system 116, it may do so by communicating with serving system 116. Serving MSC 116 supports wireless communications of MSs 122 and third party MSs 126 that have roamed onto serving system 116.

In one aspect, central station 124 which may reside on the home system 104, operates to coordinate communications between third party MSs 126, dispatch centers 123, fleet management systems 125, or other administration entities. For example, the central station 124 periodically communicates with the MS 126 to determine information such as current position, cargo state, vehicle parameters, and/or any other information. This information is then passed to, for example, a fleet management center 125.

It an instance where central station 124 wishes to communicate with MS 126 but MS 126 is in a power down sleep mode or otherwise unavailable, it further be assumed that when the MS 126 becomes available, it is unable to communicate over home network 104 (with which it was most recently registered). Consequently, MS 126 must use an appropriate network personality (e.g., MIN or ESN) to listen for communications on serving system 116.

In the instance where central station 124 wishes to communicate with the MS 126 but where communications are not possible due to MS 126 being in a power-down or sleep mode, central station 124 transmits an information message to serving MSC 106. For instance, the information message comprises a message to the MS 126 instructing MS 126 to contact the central station 124 (i.e., "call home"). In one aspect the information message to MS 126 also includes a request that home system 104 provide a "call home" message to MS 126 as soon as MS 126 becomes available. In connection with MS 126 powering down or going into sleep mode, afar having been most recently registered with serving system 116, serving system 116 transmits a registration cancellation messages REGCANC, to serving MSC 106. REGCANC cancels the registration of MS 126 at serving VLR 108. As a result, the authentication and/or authorization information contained at the serving VLR 108 that allows MS 126 to communicate over serving system 116 is cancel ed. When MS 126 awakens up or otherwise becomes available, it attempts to listen for messages on the servings system 116 by registering with third party network 120 through serving MSC 106. Because the registration of the MS 126 has been canceled and removed from the serving VLR 108, MS 126 must communicate with the home system 104 to register on the communications network 100. The communication with home system 104 signals home system 104 that the MS 126 is awake and available to receive forward communications. After the registration process is complete, the home system 104 establishes communications with the MS 126 and transmits a system access message to the MS 126 which notifies MS 126 to contact the central station 124. Upon receipt of the system access message, the MS 126 communicates with the central station 124 using either of its network personalities.

Thus, in one or more embodiments, a signaling system is provided that cancels a terminal registration at a VLR thereby causing the terminal to register at an HLR, 110. The registration acts as a signal that the MS 126 is available to receive forward communications. Once the registration is complete, communications with the terminal are established and a message is transmitted to the MS 126. For example, the message may request further communications with the MS 126. As a result, communications with the MS 126 are readily established soon after the MS 126 wakes up from a power-down mode or otherwise becomes available.

FIG. 2 is a diagram illustrating one embodiment for a typical ANSI-41 registration cancellation activity, focusing only on the essential elements of the message flow relating to registration cancellation. This illustration depicts the home system interacting with two serving systems, both of which have large service areas while the home system has no wireless coverage. In this embodiment the registration cancellation message is sent from the home system to the serving system to cancel the MS's registration. The serving system 2, MSC-2 and VLR-2 with a registration notification REGNOT to notify the HLR to remove the registration of the MS from the serving system. The serving system MSC-2 and VLR-2 respond with confirmation regnot messages. The HLR sends a registration cancellation message REGCANC to the serving system's MSC-2 and VLR-2 to remove the registration of the MS from the serving system. The serving system responds with registration cancellation, regcanc from MSC-2 and VLR-2 to complete the removal of the MS's registration. Thus, the foregoing operates to provide a signaling system to transmit a message to a selected mobile station when that MS becomes available for incoming messages only on the home system. It should be noted that the above is just one implementation and that changes, additions, deletions, combinations, and/or rearrangements of the described functions may be made without deviating from the scope of the described embodiments.

Accordingly, while one or more embodiments of a signaling system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for signaling that a device is available to receive one or more forward communications, the method comprising:
    transmitting, from a mobile switching center (MSC) of a home system, a registration cancellation message to a serving system to cancel registration of the device to wirelessly communicate over a wireless network at a visiting location register of the serving system, wherein the registration cancellation message is transmitted when the device is unavailable to receive the one or more forward communications;
    receiving, subsequent to the cancelation registration of the device, an information message to be transmitted to the device, wherein the information message includes the one or more forward communications;
    receiving a registration message to register the device on the wireless network to communicate over the wireless network; and
    transmitting the information message to the device via the wireless network in response to registering the device on the wireless network.

2. The method of claim 1, wherein receiving a registration message further comprises registering the device on a home location register of the wireless network.

3. The method of claim 1, further comprising receiving the registration message from the device.

4. The method of claim 1, further comprising determining that the device is available to receive the one or more forward communications based on the registration message.

5. The method of claim 1, wherein:
    the information message is received from a central station in communication with the home system, and
    the one or more forward communications notify the device to contact the central station.

6. Apparatus for signaling that a device is available to receive forward communications, the apparatus comprising:
    logic configured to transmit, from a mobile switching center (MSC) of a home system, a registration cancellation message to a serving system to cancel registration of the device to wirelessly communicate over a wireless network at a visiting location register of the serving system, wherein the logic configured to transmit the registration cancellation message comprises logic configured to transmit the registration cancellation message when the device is unavailable to receive the one or more forward communications;
    logic configured to receive, subsequent to the cancelation registration of the device, an information message to be transmitted to the device, wherein the information message includes the one or more forward communications;
    logic configured to receive a registration message to register the device on the wireless network to communicate over the wireless network; and
    logic configured to transmit the information message to the device via the wireless network in response to registering the device on the wireless network.

7. The apparatus of claim 6, wherein the logic configured to receive a registration message further comprises logic configured to register the device on a home location register of the wireless network.

8. The apparatus of claim 6, further comprising logic configured to receive the registration message from the device.

9. The apparatus of claim 6, further comprising logic configured to determine that the device is available to receive the one or more forward communications based on the registration message.

10. Apparatus for signaling that a device is available to receive one or more forward communications, the apparatus comprising:
- means for transmitting, from a mobile switching center (MSC) of a home system, a registration cancellation message to a serving system to cancel registration of the device to wirelessly communicate over a wireless network at a visiting location register of the serving system, wherein the means for transmitting the registration message comprises means for transmitting the registration cancellation message when the device is unavailable to receive the one or more forward communications;
- means for receiving, subsequent to the cancelation registration of the device, an information message to be transmitted to the device, wherein the information message includes the one or more forward communications;
- means for receiving a registration message to register the device on the wireless network to communicate over the wireless network; and
- means for transmitting the information message to the device via the wireless network in response to registering the device on the wireless network.

11. The apparatus of claim 10, wherein the means for receiving a registration message further comprises means for registering the device on a home location register of the wireless network.

12. The apparatus of claim 10, further comprising means for receiving the registration message from the device.

13. The apparatus of claim 10, further comprising means for determining that the device is available to receive the one or more forward communications based on the registration message.

14. A non-transitory computer-readable media comprising instructions, which when executed by at least one processor, operate to signal that a device is available to receive one or more forward communications, the computer-readable media comprising:
- instructions for transmitting, from a mobile switching center (MSC) of a home system, a registration cancellation message to a serving system to cancel registration of the device to wirelessly communicate over a wireless network at a visiting location register of the serving system, wherein the instructions for transmitting the registration cancellation message comprise instructions for transmitting the registration cancellation message when the device is unavailable to receive the one or more forward communications;
- instructions for receiving, subsequent to the cancelation registration of the device, an information message to be transmitted to the device, wherein the information message includes the one or more forward communications;
- instructions for receiving a registration message to register the device on the wireless network to communicate over the wireless network; and
- instructions for transmitting the information message to the device via the wireless network in response to registering the device on the wireless network.

15. The non-transitory computer-readable media of claim 14, wherein the instructions for receiving a registration message further comprises instructions for registering the device on a home location register of the wireless network.

16. The non-transitory computer-readable media of claim 14, further comprising instructions for receiving the registration message from the device.

17. The non-transitory computer-readable media of claim 14, further comprising instructions for determining that the device is available to receive the one or more forward communications based on the registration message.

18. At least one processor configured to perform a method for signaling that a device is available to receive one or more forward communications, the method comprising:
- transmitting, from a mobile switching center (MSC) of a home system, a registration cancellation message to a serving system to cancel registration of the device at a visiting location register of the serving system, wherein the registration cancellation message is transmitted when the device is unavailable to receive the one or more forward communications;
- receiving, subsequent to the cancelation registration of the device, an information message to be transmitted to the device, wherein the information message includes the one or more forward communications;
- receiving a registration message to register the device on the wireless network to communicate over the wireless network; and
- transmitting the information message to the device via the wireless network in response to registering the device on the wireless network.

19. The method of claim 18, wherein receiving a registration message further comprises registering the device on a home location register of the wireless network.

20. The method of claim 18, further comprising receiving the registration message from the device.

21. The method of claim 18, further comprising determining that the device is available to receive the one or more forward communications based on the registration message.

* * * * *